US012649209B2

(12) United States Patent
Kon et al.

(10) Patent No.: US 12,649,209 B2
(45) Date of Patent: Jun. 9, 2026

(54) MACHINE TOOL

(71) Applicants: CITIZEN WATCH CO., LTD., Nishitokyo (JP); CITIZEN MACHINERY CO., LTD., Kitasaku-gun (JP)

(72) Inventors: Nobuyasu Kon, Kitasaku-gun (JP); Katsuki Shimizu, Kitasaku-gun (JP); Misae Satoh, Kitasaku-gun (JP); Takanori Shinohara, Kitasaku-gun (JP)

(73) Assignees: CITIZEN WATCH CO., LTD., Nishitokyo (JP); CITIZEN MACHINERY CO., LTD, Kitasaku-Gun (JP)

( * ) Notice: Subject to any disclaimer, the term of this patent is extended or adjusted under 35 U.S.C. 154(b) by 238 days.

(21) Appl. No.: 18/693,426

(22) PCT Filed: Dec. 12, 2022

(86) PCT No.: PCT/JP2022/045735
§ 371 (c)(1),
(2) Date: Mar. 19, 2024

(87) PCT Pub. No.: WO2023/120285
PCT Pub. Date: Jun. 29, 2023

(65) Prior Publication Data
US 2024/0424629 A1      Dec. 26, 2024

(30) Foreign Application Priority Data
Dec. 20, 2021      (JP) ................................. 2021-206079

(51) Int. Cl.
*B23Q 15/12*          (2006.01)
(52) U.S. Cl.
CPC ................................... *B23Q 15/12* (2013.01)

(58) Field of Classification Search
CPC .......................... B23Q 15/12; B23Q 17/2208; B23Q 11/0891; G05B 19/4061
See application file for complete search history.

(56) References Cited

U.S. PATENT DOCUMENTS

| | | |
|---|---|---|
| 2016/0184951 A1 | 6/2016 | Kurokawa |
| 2017/0326700 A1 | 11/2017 | Morimura |

FOREIGN PATENT DOCUMENTS

| | | | |
|---|---|---|---|
| CN | 104570929 A | 4/2015 | |
| EP | 0614724 A2 * | 9/1994 | ............. B23Q 11/08 |

(Continued)

OTHER PUBLICATIONS

English Translation of "EP-0614724-A2" (Year: 1994).*

(Continued)

*Primary Examiner* — Charles R Kasenge
(74) *Attorney, Agent, or Firm* — CANTOR COLBURN LLP

(57) ABSTRACT
A machine tool includes a spindle that is placed on a bed and grips a workpiece, a first slide mechanism including a first rail that is fixed to the bed and extends in a first direction intersecting a spindle direction in which the spindle extends and a first table that is slidable along the first rail, a second slide mechanism including a second rail that is provided on the first table of the first slide mechanism and extends in a second direction intersecting the spindle direction and the first direction and a second table that is slidable along the second rail, a tool post that is placed on the second table of the second slide mechanism and holds a tool for machining the workpiece, a cover that covers the spindle, the first slide mechanism, the second slide mechanism and the tool post, and a controller.

13 Claims, 10 Drawing Sheets

(56)                    References Cited

FOREIGN PATENT DOCUMENTS

| | | | |
|---|---|---|---|
| JP | H04223802 | A | 8/1992 |
| JP | 2016124046 | A | 7/2016 |
| JP | 2017102532 | A | 6/2017 |
| JP | 2017202548 | A | 11/2017 |
| JP | 2018075667 | A | 5/2018 |

OTHER PUBLICATIONS

International Search Report dated Feb. 1, 2023; International Application No. PCT/JP2022/045735; 5 pages (with English Translation). Written Opinion issued in Japanese Application No. PCT/JP2022/045735 dated Feb. 14, 2023; 6 pages (with English Translation).

* cited by examiner

FIG. 8A
SPINDLE
SIDE
COVER
SIDE
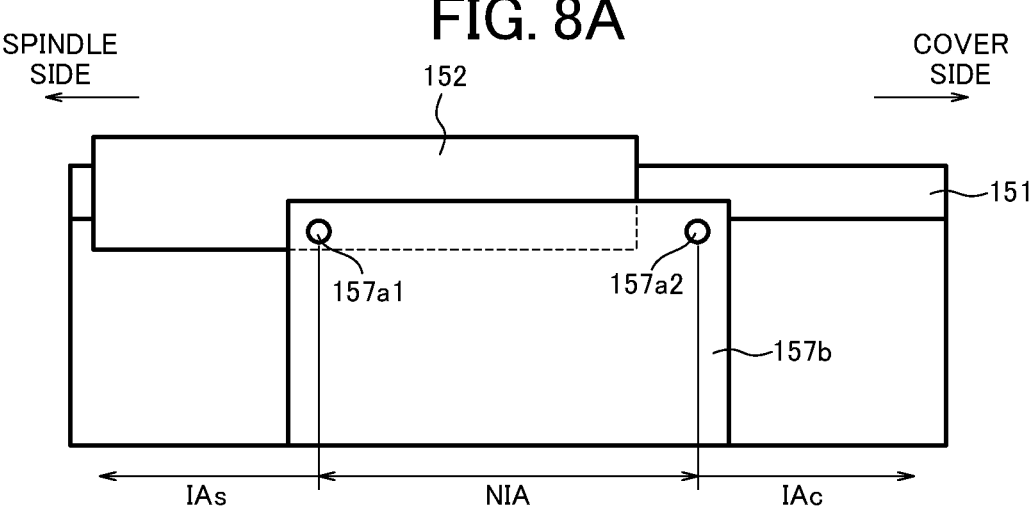
152
151
157a1          157a2
157b
IAs          NIA          IAc
FIG. 8B
SPINDLE
SIDE
COVER
SIDE
152
151
157a1          157a2
157b
IAs          NIA          IAc
FIG. 8C
SPINDLE
SIDE
COVER
SIDE
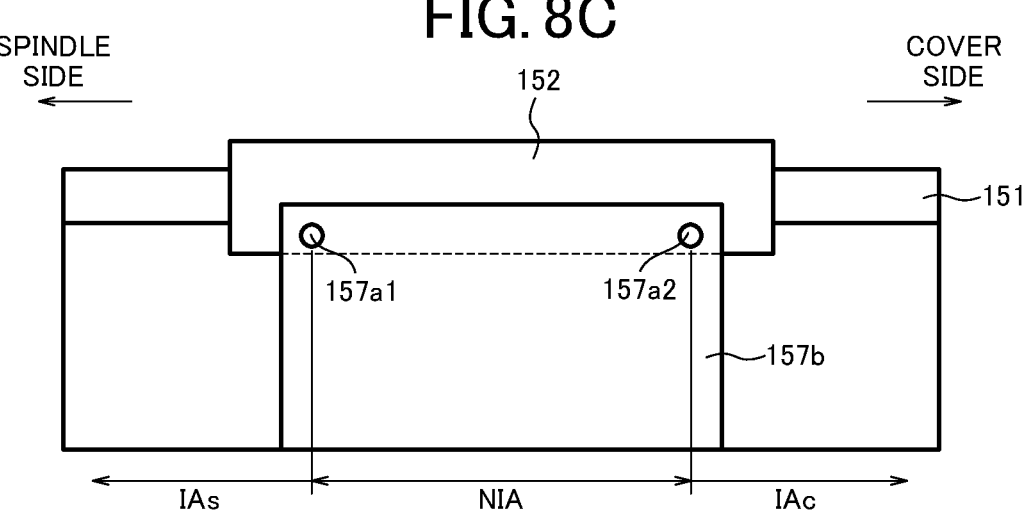
152
151
157a1          157a2
157b
IAs          NIA          IAc

MACHINE TOOL

CROSS-REFERENCE TO RELATED APPLICATIONS

The present application is a national stage application of PCT/JP2022/045735 filed Dec. 12, 2022, and claims priority to Japanese Patent Application No. JP2021-206079A filed Dec. 20, 2021, the contents of which are incorporated by reference in their entirety.

TECHNICAL FIELD

The present invention relates to a machine tool, and in particular to a machine tool in which a tool post is movable in two axial directions.

SUMMARY

Conventionally, a machine tool is known, which comprises: a machining slide (machining table) that is movable in two axial directions of a Y axis, which is perpendicular to a Z axis that is the longitudinal direction of a bed and which is parallel to the bed, and an X axis, which is perpendicular to the Y axis and the Z axis, wherein by using the machining slide movable in the Y axis direction and the X axis direction, various types of machining can be performed on a workpiece. (for example, see JP 04-223802 A, see FIG. 2).

The machining slide of this machine tool is provided with a turret (tool post) to which a tool such as a cutting tool is attached.

In order to machine a workpiece with high accuracy in the machine tool described above, it may be beneficial to grasp and set the position of the machining slide with high accuracy. Therefore, it is necessary to periodically move the machining slide to the reference point (origin) of the machine tool. This operation is called an origin return operation.

Since this origin return operation may need to be performed for each control axis, if the machining slide is movable in the X axis and Y axis directions, origin return operations for the X axis and Y axis must be performed respectively. However, during the origin return operation, the machine tool cannot correctly grasp the position of the machining slide. Thus, even if the turret is retracted in the Z-axis direction with respect to the spindle during origin return operation, there may be a risk that the machining slide will interfere with the spindle that holds the workpiece or the cover that covers the functional components of the machine tool.

One or more embodiments provides a machine tool in which, even during an origin return operation, the machining table does not interfere with the spindle or the cover in a state where the tool post is retracted in the spindle direction with respect to the spindle.

According to one or more embodiments, a machine tool comprises a spindle that is placed on a bed and grips a workpiece; a first slide mechanism including a first rail that is fixed to the bed and extends in a first direction intersecting a spindle direction in which the spindle extends and a first table that is slidable along the first rail; a second slide mechanism including a second rail that is provided on the first table of the first slide mechanism and extends in a second direction intersecting the spindle direction and the first direction and a second table that is slidable along the second rail; a tool post that is placed on the second table of the second slide mechanism and holds a tool for machining the workpiece; a cover that covers the spindle, the first slide mechanism, the second slide mechanism and the tool post; and a control device that controls and drives the first slide mechanism and the second slide mechanism, the tool post being approachable to the spindle and the cover, wherein the first slide mechanism includes a first table position detection unit that detects a position of the first table with respect to the first rail, wherein the control device includes a second table positioning control section that sets a position of the second table at a predetermined position with respect to the second rail, wherein the first table position detection unit detects whether the first table is located in a non-interference area, in which the second table does not interfere with the spindle or the cover even when the second table is slid on the second rail, or an interference area, in which the second table may interfere with the spindle or the cover when the second table is slid on the second rail, and wherein the second table positioning control section sets a position of the second table with respect to the second rail in a state where the first table is located in the non-interference area.

According to one or more embodiments, the control device includes a first table positioning control section that sets a position of the first table at a predetermined position with respect to the first rail, and wherein the first table position detection unit is also used for setting a position of the first table with respect to the first rail of the first slide mechanism.

According to one or more embodiments, the first table position detection unit includes at least one proximity sensor that detects the first table in at least one detection position that is at least one boundary between the non-interference area and the interference area on the first rail.

According to one or more embodiments, the interference area is composed of a spindle interference area, in which the second table may interfere with the spindle, and a cover interference area, in which the second table may interfere with the cover, wherein the non-interference area is formed between the spindle interference area and the cover interference area, wherein each of the proximity sensors is provided such that a detection position thereof is at each end of the non-interference area of the first rail, and wherein the proximity sensors of the first table position detection unit are normally open type proximity sensors.

According to one or more embodiments, the first rail is inclined with respect to a horizontal plane.

The machine tool according to one or more embodiments comprises a first slide mechanism, a second slide mechanism and a control device that controls and drives the first slide mechanism and the second slide mechanism. The machine tool according to one or more embodiments may machine a workpiece with higher accuracy by driving the tool post in two directions.

In a machine tool according to one or more embodiments, the second table positioning control section sets the position of the second table with respect to the second rail in a state where the first table is positioned in the non-interference area. Thereby, when setting the position of the second table with respect to the second rail, even if the second table is slid on the second rail, the second table does not interfere with the spindle or the cover. Thus, even when performing a positioning operation such as an origin return operation, in a state where the tool post is retracted from the spindle in the spindle direction, it may be possible to reliably prevent the second table as the machining table from interfering with the spindle or the cover.

In a machine tool according to one or more embodiments, the first table position detection unit is also used for setting a position of the first table with respect to the first rail of the first slide mechanism. Thereby, when performing an origin return operation of the first table, it is determined whether the first table is in the non-interference area or in the interference area. Thus, even if the first table is located in the interference area while performing the origin return operation of the first table, by moving the second table to a position where the second table does not interfere with the spindle or the cover and continuing the origin return operation of the first table, it may be possible to prevent the second table from interfering with the spindle or the cover during the origin return operation of the first table.

In a machine tool according to one or more embodiments, the first table position detection unit includes at least one proximity sensor that detects the first table in at least one detection position that is at least one boundary between the non-interference area and the interference area on the first rail. Thereby, the proximity sensor detects the first table, and the position of the first table with respect to the first rail is detected. Thus, the machine tool may grasp with a simple structure whether the first table is located in the non-interference area or the interference area.

In a machine tool according to one or more embodiments, the proximity sensors of the first table position detection unit are normally open type proximity sensors. Thereby, when the first table is located in the spindle interference area or the cover interference area, or when the proximity sensors are out of order, a signal is no longer output from the proximity sensors, and when the proximity sensors are out of order, the machine tool determines that the first table is located in the interference area. Thus, it may be possible to prevent performing the positioning operation by prohibiting the movement of the first table when the proximity sensors are out of order.

In a machine tool according to one or more embodiments, the first rail is inclined with respect to a horizontal plane. Thereby, the length of the bed in the front-back direction is shortened, and the length of the machine tool in the front-back direction is shortened. Thus, the distance between the spindle or the tool post and the cover becomes shorter, and a user of the machine tool may easily access the spindle and the tool post.

BRIEF DESCRIPTION OF DRAWINGS

FIG. 8A is a schematic diagram showing the position of the X table corresponding to FIG. 7A.

FIG. 8B is a schematic diagram showing the position of the X table corresponding to FIG. 7B.

FIG. 8C is a schematic diagram showing the position of the X table corresponding to FIG. 4.

DETAILED DESCRIPTION

Figure 1:
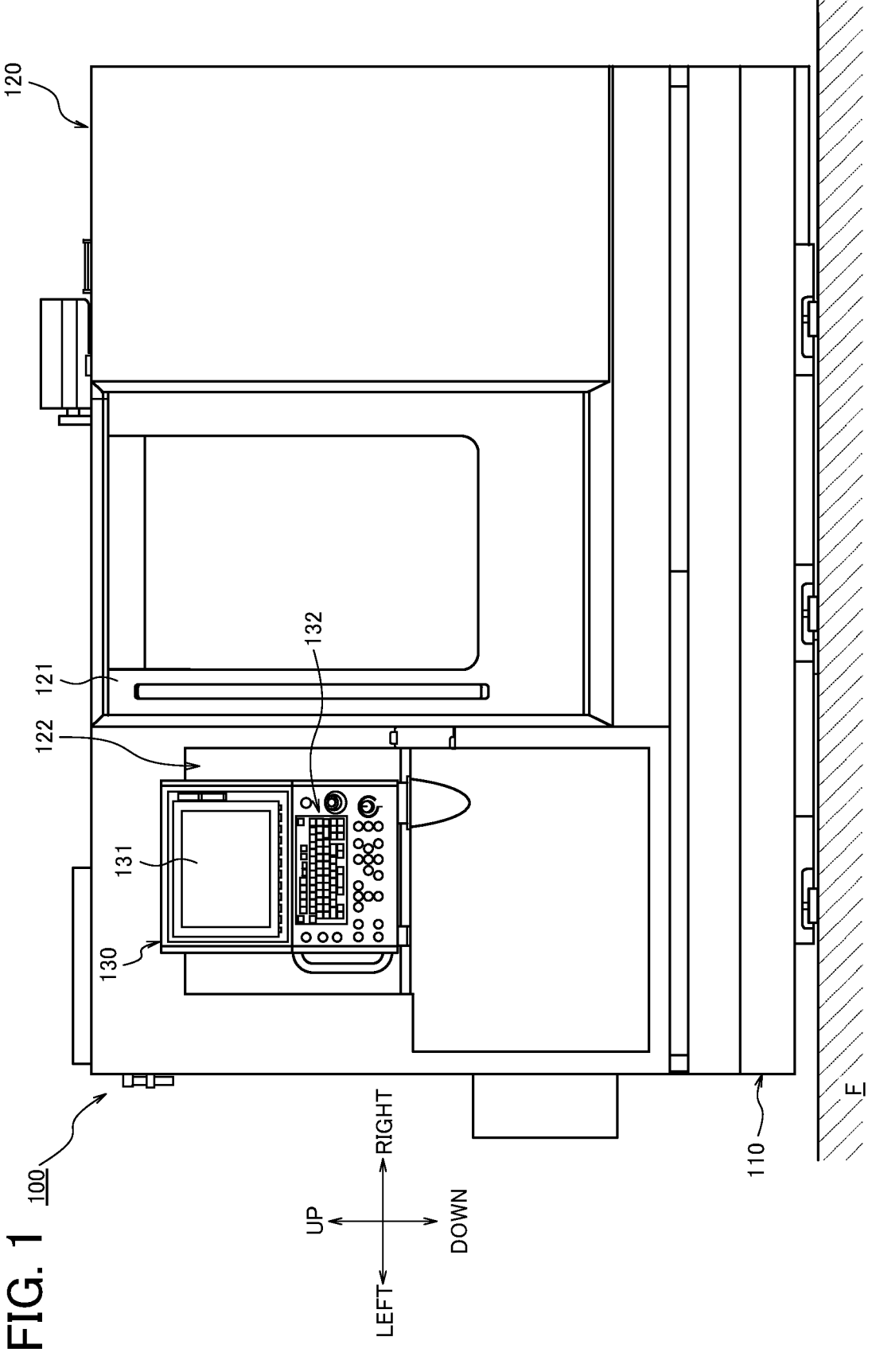
FIG. 1 is a front view of a machine tool according to one or more embodiments.

Embodiments of the present disclosure will be described below with reference to the drawings. However, the embodiments are merely exemplary, and are not intended to limit the scope of the claims.

A machine tool according to one or more embodiments comprises: a spindle that is placed on a bed and grips a workpiece; a first slide mechanism including a first rail that is fixed to the bed and extends in a first direction intersecting a spindle direction in which the spindle extends and a first table that is slidable along the first rail; a second slide mechanism including a second rail that is provided on the first table of the first slide mechanism and extends in a second direction intersecting the spindle direction and the first direction and a second table that is slidable along the second rail; a tool post that is placed on the second table of the second slide mechanism and holds a tool for machining the workpiece; a cover that covers the spindle, the first slide mechanism, the second slide mechanism and the tool post; and a control device that controls and drives the first slide mechanism and the second slide mechanism, the tool post being approachable to the spindle and the cover, wherein the first slide mechanism includes a first table position detection unit that detects a position of the first table with respect to the first rail, wherein the control device includes a second table positioning control section that sets a position of the second table at a predetermined position with respect to the second rail, wherein the first table position detection unit detects whether the first table is located in a non-interference area, in which the second table does not interfere with the spindle or the cover even when the second table is slid on the second rail, or an interference area, in which the second table may interfere with the spindle or the cover when the second table is slid on the second rail, and wherein the second table positioning control section sets a position of the second table with respect to the second rail in a state where the first table is located in the non-interference area, and thereby, even during an origin return operation, the second table as a machining table does not interfere with the spindle or the cover in a state where the tool post is retracted in the spindle direction with respect to the spindle.

For example, the cover in the machine tool of one or more embodiments may be of any type as long as the cover can cover the spindle, the first slide mechanism, the second slide mechanism and the tool post. The cover may be an exterior cover that forms the exterior of the machine tool or may be a member provided within the exterior cover.

For example, the tool post in the machine tool of one or more embodiments may be a turret having a plurality of tools or may be a tool post having a single tool.

For example, the first direction in the machine tool of one or more embodiments may be any direction as long as the first direction intersects the spindle direction. The first direction may be a direction inclined with respect to the horizontal plane or may be a direction that intersects the spindle direction on the horizontal plane.

For example, the second direction in the machine tool of one or more embodiments may be any direction as long as the second direction intersects the spindle direction and the first direction. The second direction may be a direction inclined to the horizontal plane or may be a direction perpendicular to the horizontal plane.

For example, the predetermined position of the second table with respect to the second rail set by the second table positioning control section in the machine tool of one or more embodiments may be the origin or may be any other predetermined position.

EXAMPLE 1

Hereinafter, a machine tool 100 according to one or more embodiments will be described based on FIGS. 1 to 9.

1. Overview of Machine Tool

Figure 2:
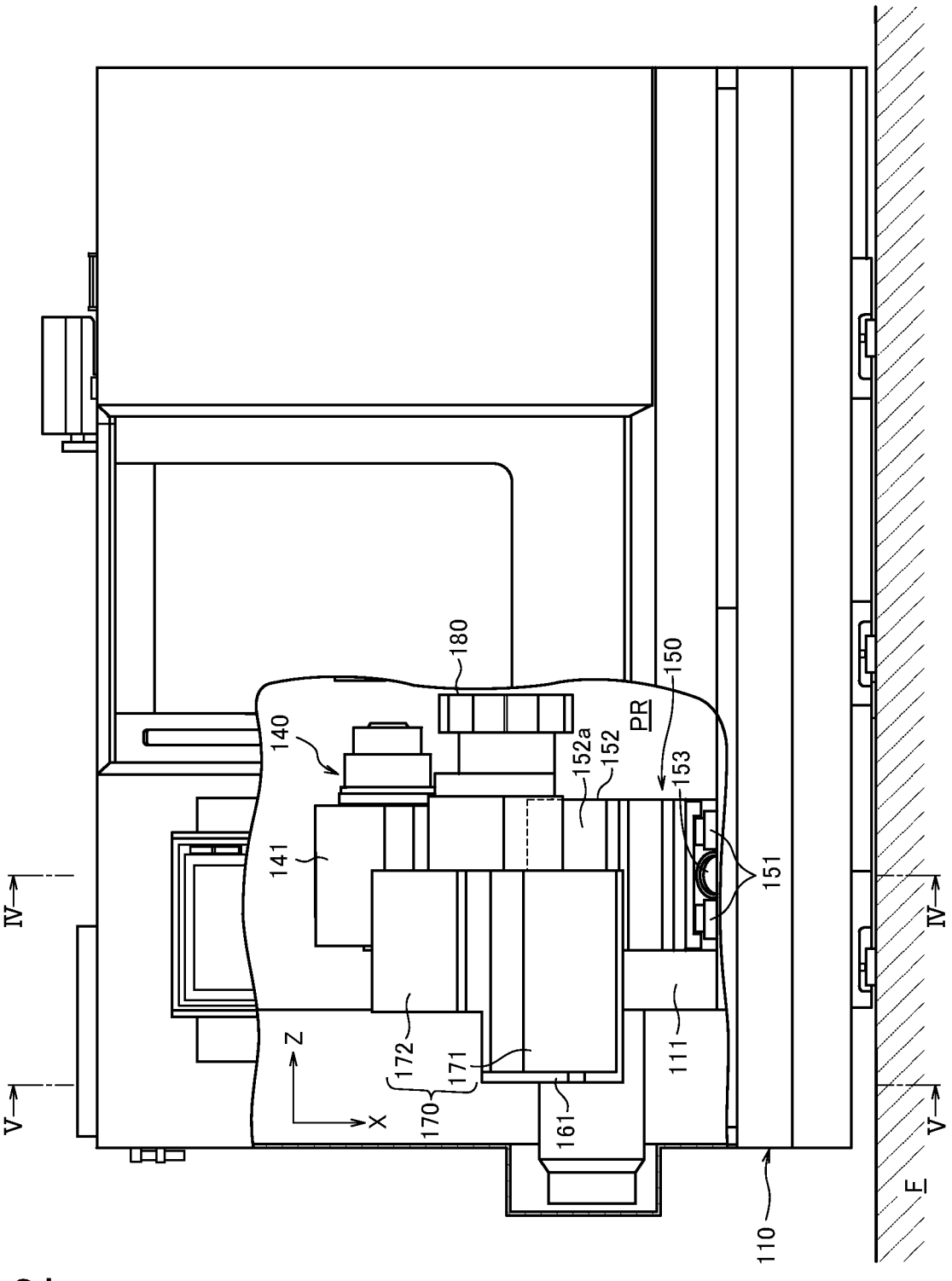
FIG. 2 is a front view of the machine tool shown in FIG. 1 with a cover partially removed.
Figure 3:
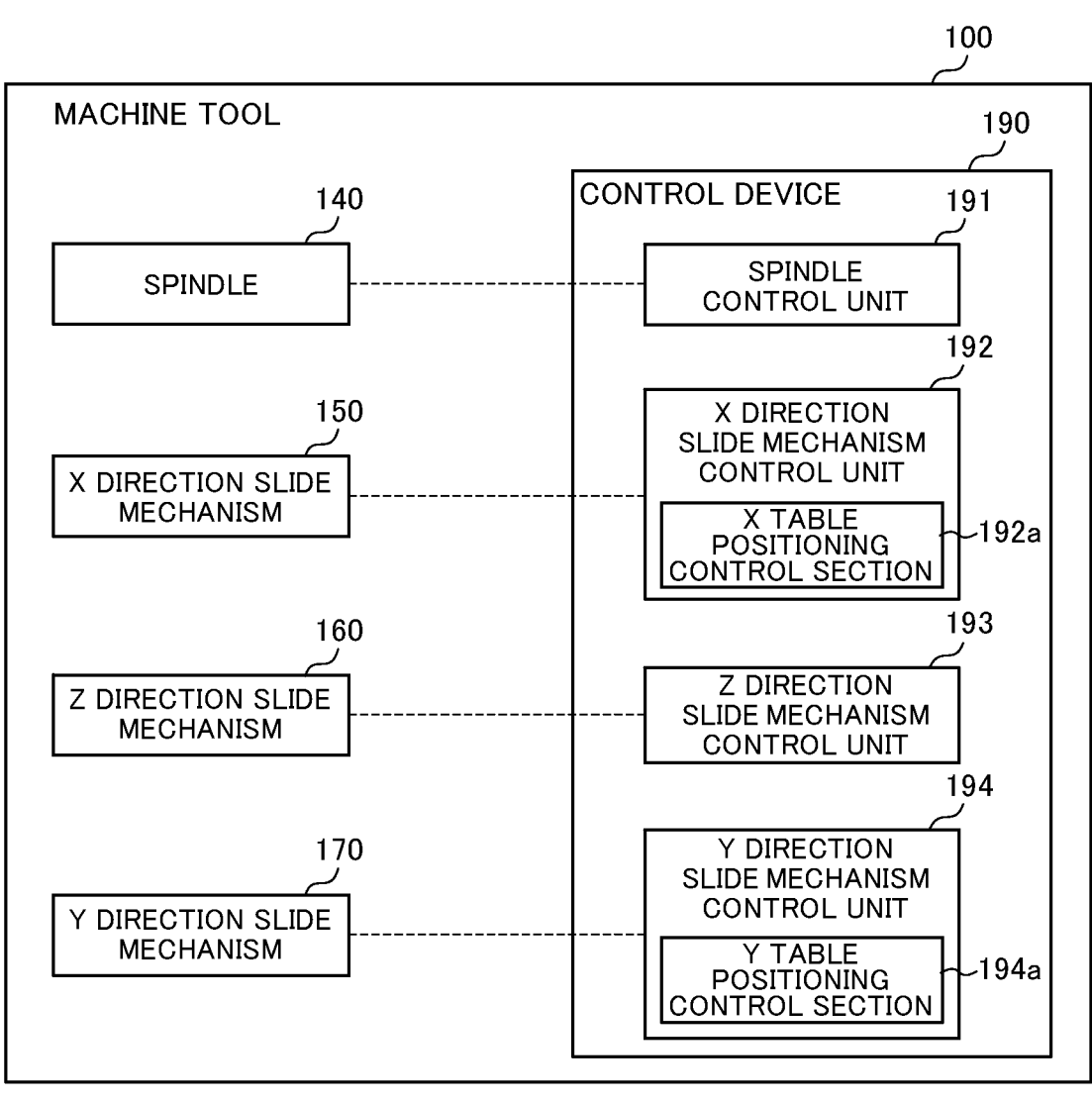
FIG. 3 is a system configuration diagram of the machine tool shown in FIG. 1.
Figure 4:
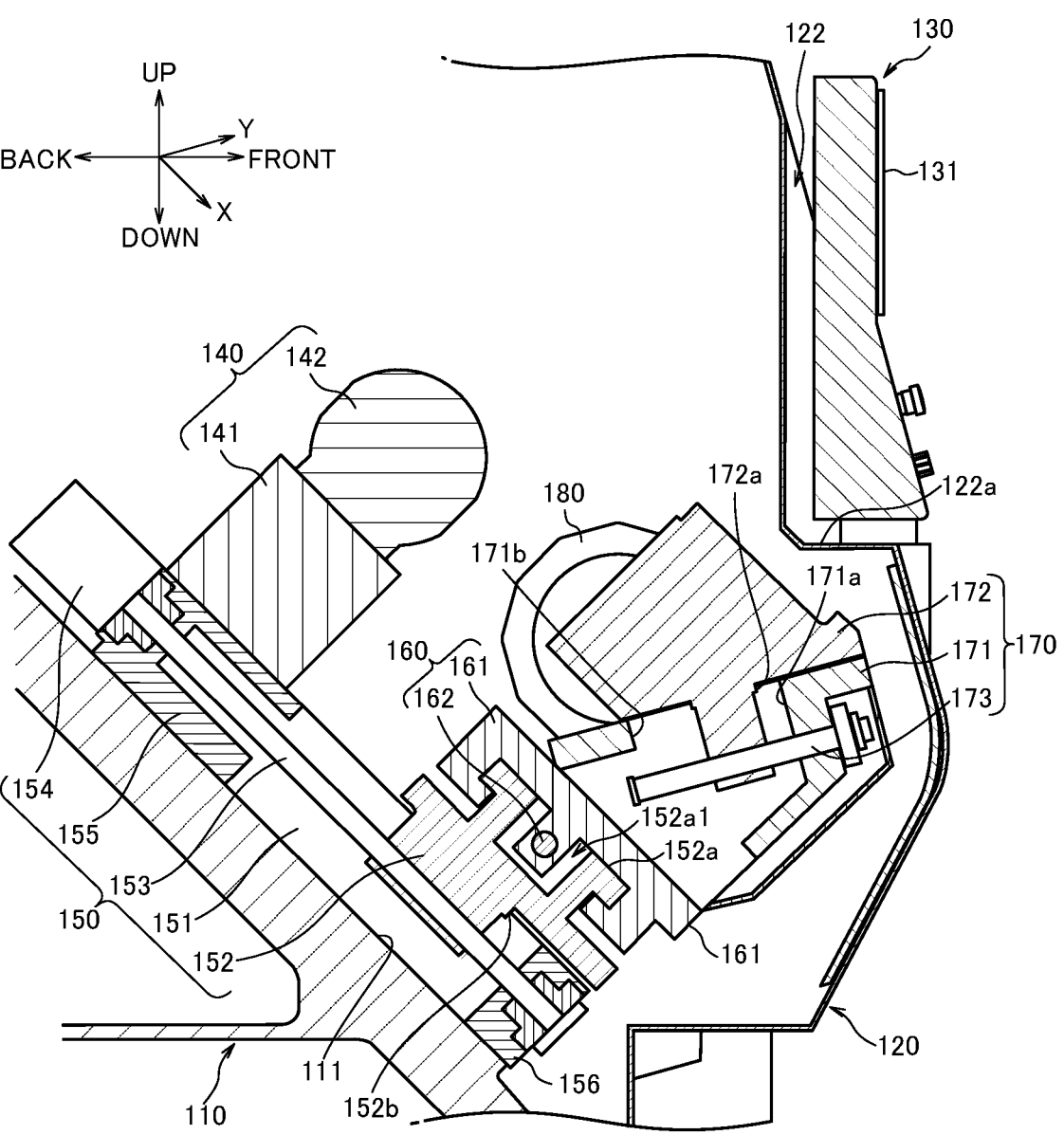
FIG. 4 is a side cross-sectional view of the main portion of the machine tool taken along line IV-IV in FIG. 2.
Figure 5:
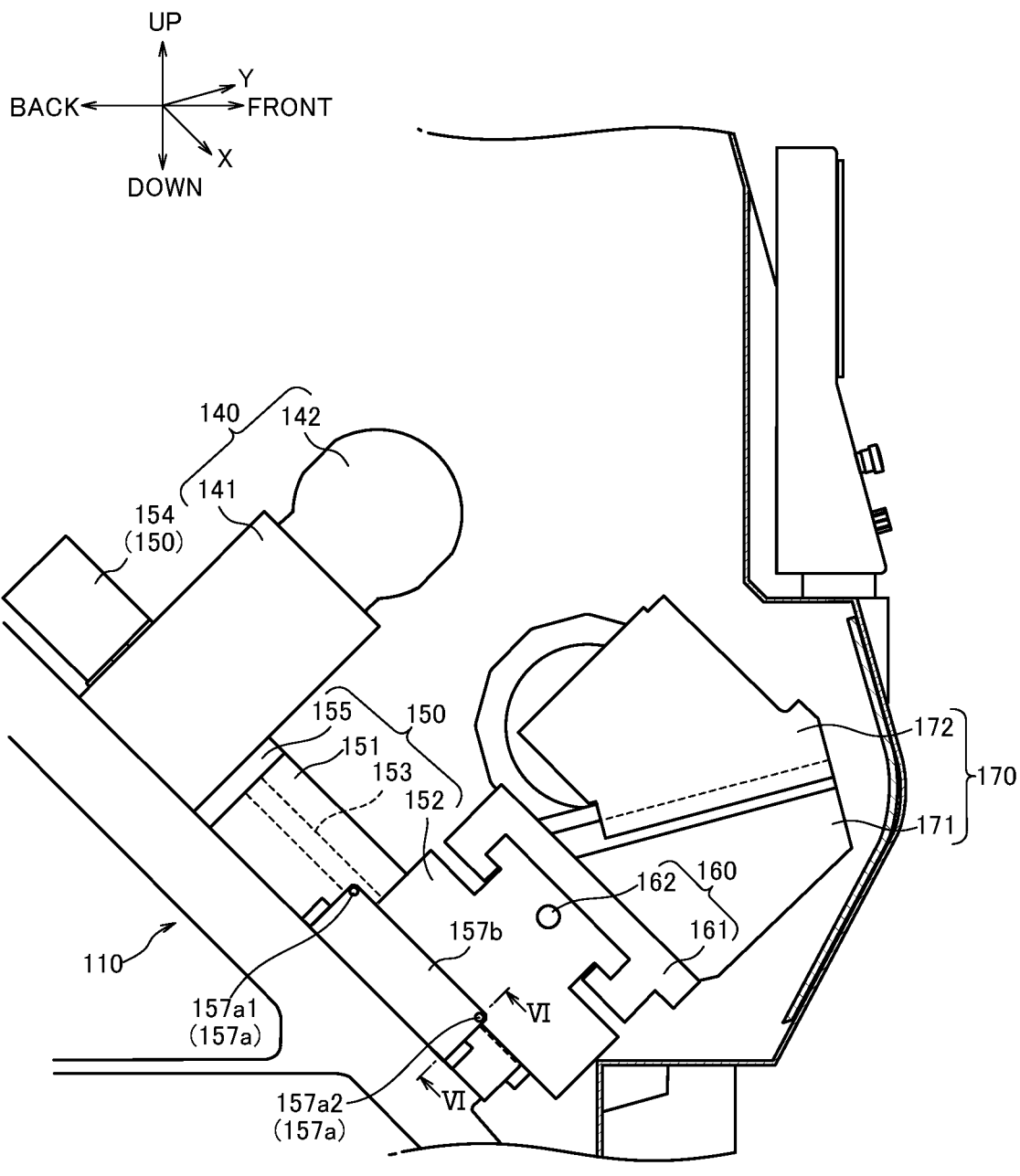
FIG. 5 is a side cross-sectional view of the main portion of the machine tool taken along line V-V in FIG. 2.
Figure 6:
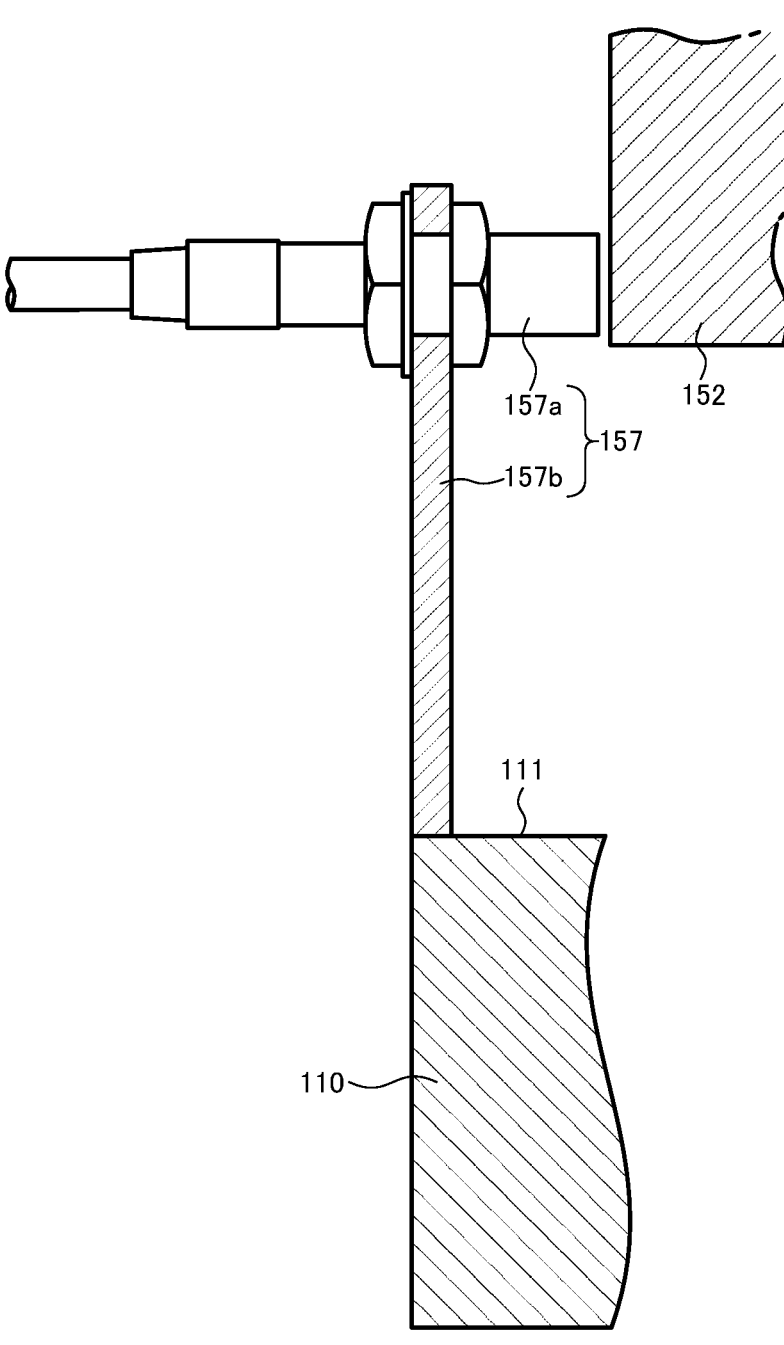
FIG. 6 is a cross-sectional view of the main portion of the machine tool taken along line VI-VI in FIG. 5.

First, an overview of the machine tool 100 will be explained based on FIGS. 1 to 6. FIG. 1 is a front view of a machine tool according to one or more embodiments, FIG. 2 is a front view of the machine tool shown in FIG. 1 with a cover partially removed, FIG. 3 is a system configuration diagram of the machine tool shown in FIG. 1, FIG. 4 is a side cross-sectional view of the main portion of the machine tool taken along line IV-IV in FIG. 2. FIG. 5 is a side cross-sectional view of the main portion of the machine tool taken along line V-V in FIG. 2, and FIG. 6 is a cross-sectional view of the main portion of the machine tool taken along line VI-VI in FIG. 5.

1.1. Exterior Structure

The machine tool 100 is an automatic lathe and, as shown in FIG. 1, comprises a bed 110 that is placed on a floor surface F, a rectangular parallelepiped exterior cover (cover) 120 that forms the exterior and an operation panel 130 for a user of the machine tool 100 to operate the machine tool 100.

The bed 110 has a rectangular shape in a plan view. Hereinafter, the direction perpendicular to the floor surface F is defined as the vertical direction of the machine tool 100, the longitudinal direction of the bed 110 in plan view is defined as the left-right direction (Z direction) of the machine tool 100, and the short direction of the bed 110 in plan view is defined as the front-back direction of the machine tool 100. Further, as shown in FIG. 4, the bed 110 has an inclined base surface 111 that is inclined downward from the back toward the front in side view. Hereinafter, the inclination direction of the inclined base surface 111 inclined with respect to the horizontal plane will be referred to as the X direction.

As shown in FIG. 1, the exterior cover 120 has a slide door 121 near the center in the left-right direction that can be opened and closed in the left-right direction. By opening this slide door 121, a user of the machine tool 100 can access a processing room PR (see FIG. 2) where a workpiece is machined. Further, as shown in FIGS. 1 and 4, at the upper left side of the exterior cover 120, an operation panel accommodating recess 122 is formed which is recessed toward the back and downward in order to accommodate the operation panel 130. Furthermore, as shown in FIG. 4, the lower left side of the exterior cover 120 bulges forward.

As shown in FIG. 4, the operation panel 130 stands upright from an operation panel mounting surface 122a, which is the bottom surface of the operation panel accommodating recess 122 of the exterior cover 120, and a display surface 131 and keys 132 are provided on the front surface of the operation panel.

1.2. Internal Structure

As shown in FIGS. 2 and 3, the machine tool 100 further comprises a spindle 140 that is placed on the inclined base surface 111 of the bed 110 and grips a workpiece, an X direction slide mechanism (first slide mechanism) 150, a Z direction slide mechanism 160 that is fixed to the X direction slide mechanism 150, a Y direction slide mechanism (second slide mechanism) 170 that is fixed to the Z direction slide mechanism 160, a turret (tool post) 180 that is provided on the Y direction slide mechanism 170 and a control device 190 that controls the operation of the machine tool 100. As shown in FIG. 4 and the like, the spindle 140, the X direction slide mechanism 150, the Y direction slide mechanism 170 and the turret 180 are covered by the exterior cover 120.

1.2.1. Spindle

The spindle 140 extends in the Z direction (an example of "spindle direction") and includes a spindle headstock 141 fixed to the inclined base surface 111 of the bed 110 across the X direction slide mechanism 150 in the left-right direction, and a spindle main body 142 placed on the spindle headstock 141.

1.2.2. X Direction Slide Mechanism

As shown in FIGS. 4 to 6, the X direction slide mechanism 150 includes an X direction rail (first rail) 151 that is fixed to the inclined base surface 111 of the bed 110, and an X table (first table) 152 that is made of metal and slidable along the X direction rail 151, an X table drive shaft 153 that drives the X table 152, an X direction drive motor 154 that rotates the X table drive shaft 153 based on control from the control device 190, a spindle side stop member 155 and a cover side stop member 156 that are the sliding ends of the X table 152, and an X table position detection unit (first table position detection unit) 157 that detects the position of the X table 152 with respect to the X direction rail 151.

The X direction rail 151 extends in the X direction (an example of "first direction") as shown in FIG. 4. That is to say, in the present example, the X direction rail 151 is perpendicular to (intersects) the Z direction in which the spindle 140 extends as shown in FIG. 2, and is inclined with respect to the horizontal plane as shown in FIG. 4.

The X table 152 is screwed by the X table drive shaft 153 and is moved forward and backward by rotation of the X table drive shaft 153. The sliding range of the X table 152 is physically regulated by the spindle side stop member 155 provided on the spindle 140 side of the X direction slide mechanism 150 and the cover side stop member 156 provided on the exterior cover 120 side of the X direction slide mechanism 150. Furthermore, a concave area 152a1, which extends in the Z direction and in which the Z direction slide mechanism 160 is mounted, is formed on an X table base surface 152a of the X table 152, which faces the exterior cover 120.

As shown in FIGS. 5 and 6, the X table position detection unit 157 includes normally open type proximity sensors 157a that detect the X table 152 in a detection position that is a predetermined position on the X direction rail 151, and a bracket 157b for attaching these proximity sensors 157a to the bed 110.

The proximity sensors 157a are proximity sensors (for example, eddy current type) that can detect a marker even if there is lubricating oil or the like, and are connected to the control device 190. Further, as shown in FIG. 6, the proximity sensors 157a are provided on the inclined base surface 111 of the bed 110 via the bracket 157b. As shown in FIG. 5, the proximity sensors 157a are composed of two sensors, which are a spindle side proximity sensor 157a1 provided on the spindle 140 side and a cover side proximity sensor 157*a*2 provided on the exterior cover 120 side.

1.2.3. Z Direction Slide Mechanism

As shown in FIGS. 4 and 5, the Z direction slide mechanism 160 includes a Z table 161 that is slidable with respect to the X table 152, a Z table drive shaft 162 that drives the Z table 161, and a Z direction drive motor (not shown) that rotates the Z table drive shaft 162 based on control from the control device 190. In the Z direction slide mechanism 160 configured in this way, Z-table 161 is slidable in the Z direction with respect to the X table 152 based on control from the control device 190.

1.2.4. Y Direction Slide Mechanism

As shown in FIGS. 4 and 5, the Y direction slide mechanism 170 includes a Y direction rail (second rail) 171 that is fixed to the Z table 161 of the Z direction slide mechanism 160, a Y table (second table) 172 that is slidable along the Y direction rail 171, a Y table drive shaft 173 that drives the Y table 172, and a Y direction drive motor (not shown) that rotates the Y table drive shaft 173 based on control from the control device 190.

The Y direction rail 171 extends in the Y direction (example of the "second direction") as shown in FIG. 4. That is to say, in the present example, the Y direction rail 171 is provided on the X table 152 of the X direction slide mechanism 150 and extends in the Y direction intersecting the Z direction and the X direction as shown in FIG. 4 and the like.

The Y table 172 is screwed by the Y table drive shaft 173 and is moved forward and backward by rotation of the Y table drive shaft 173. Furthermore, the sliding range of the Y table 172 is physically regulated by a cover side abutment portion 171*a* provided on the exterior cover side of the Y direction rail 171 and a spindle side abutment portion 171*b* provided on the spindle side of the Y direction rail 171.

1.2.5 Turret

As shown in FIG. 3 and the like, the turret 180 is placed on the Y table 172 of the Y direction slide mechanism 170 and holds a tool (not shown) for machining a workpiece. Since the turret 180 is placed on the Y table 172 and the Y table 172 is placed on the X table 152 via the Z table 161, the turret 180 is approachable to the spindle 140 and the exterior cover 120.

1.2.6. Control Device

The control device 190 is a control device that controls and drives at least the spindle 140, the X direction slide mechanism 150 and the Y direction slide mechanism 170, and, as shown in FIG. 3, includes a spindle control unit 191 that controls and drives the spindle 140, an X direction slide mechanism control unit 192 that controls and drives the X direction slide mechanism 150, a Z direction slide mechanism control unit 193 that controls and drives the Z direction slide mechanism 160, and a Y direction slide mechanism control unit 194 that controls and drives the Y direction slide mechanism 170. The X direction slide mechanism control unit 192 includes an X table positioning control section (first table positioning control section) 192*a* that controls and drives the X direction drive motor 154 to set the position of the X table 152 at a predetermined position with respect to the X direction rail 151. The Y direction slide mechanism control unit 194 includes a Y table positioning control section (second table positioning control section) 194*a* that controls and drives the Y direction drive motor to set the position of the Y table 172 at a predetermined position with respect to the Y direction rail 171.

2. Behavior of Y Table

Figure 7A:
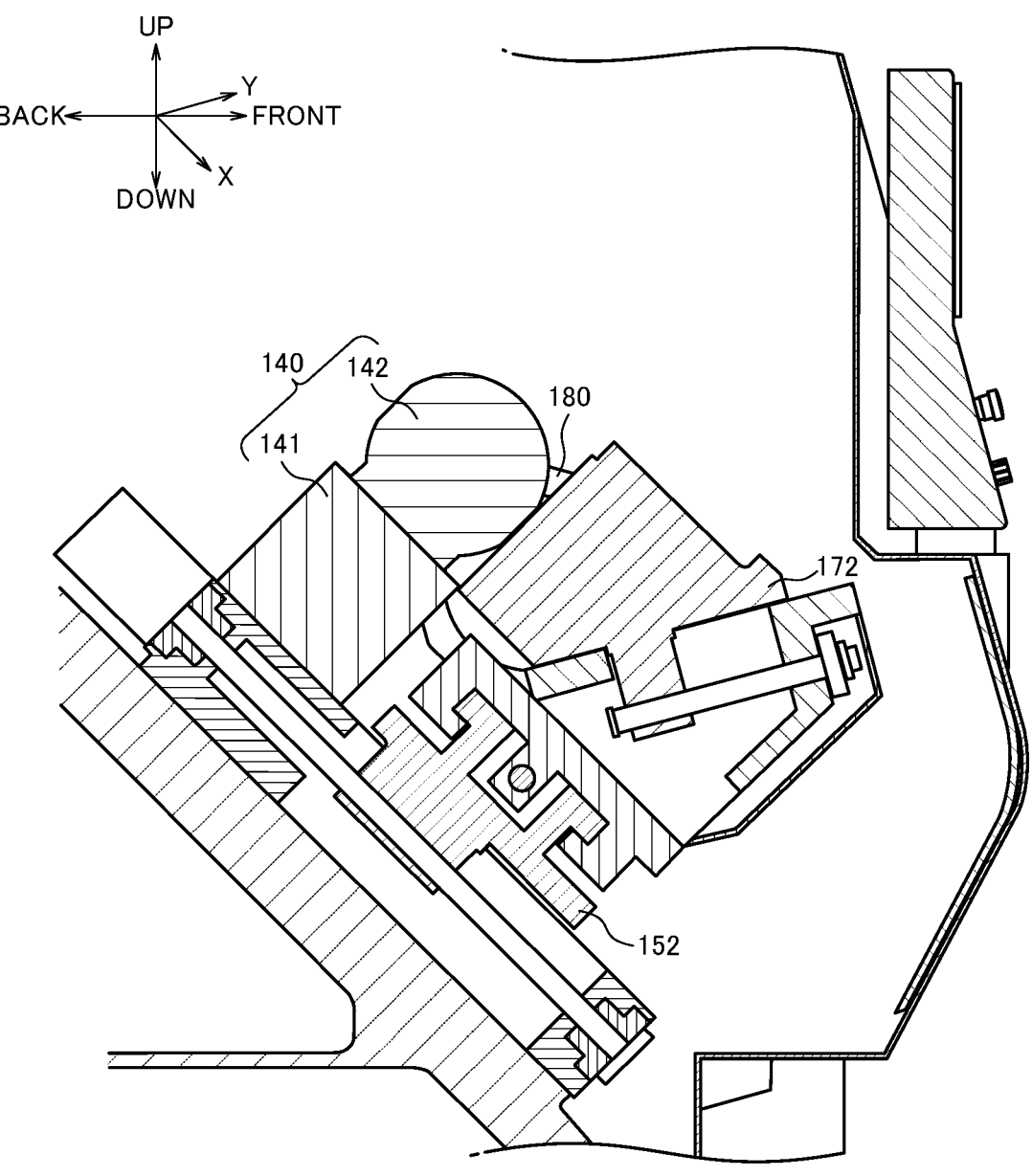
FIG. 7A is a side sectional view of the main portion showing a state in which the Y table interferes with the spindle.
Figure 7B:
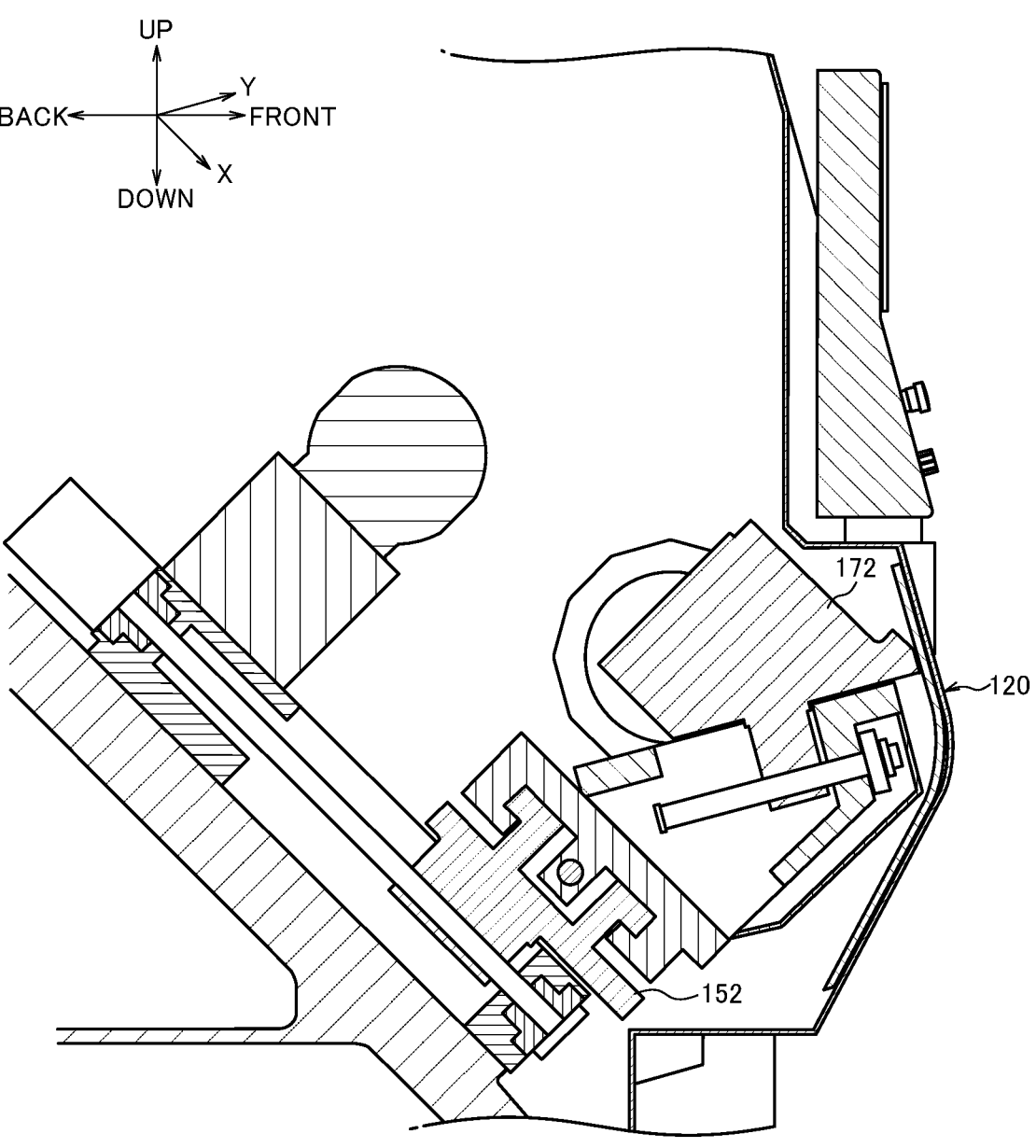
FIG. 7B is a side sectional view of the main portion showing a state in which the Y table interferes with the cover.

Next, the behavior of the Y table 172 in the machine tool 100 configured as described above will be described in more detail based on FIGS. 7A to 8C. FIG. 7A is a side sectional view of the main portion showing a state in which the Y table interferes with the spindle, FIG. 7B is a side sectional view of the main portion showing a state in which the Y table interferes with the cover. FIG. 8A is a schematic diagram showing the position of the X table corresponding to FIG. 7A, FIG. 8B is a schematic diagram showing the position of the X table corresponding to FIG. 7B, and FIG. 8C is a schematic diagram showing the position of the X table corresponding to FIG. 4.

Even if the Y table 172 is moved in the Z direction so that the turret 180 is retracted in the Z direction with respect to the spindle 140, the Y table 172 may interfere with the exterior cover 120 or the spindle 140 depending on the position of the X table 152. Particularly, if the X table 152 is positioned in the X direction as shown in FIGS. 7A and 8A, the Y table 172 interferes with the spindle headstock 141 and the spindle main body 142 of the spindle 140 depending on the position of the Y table 172 in the Y direction as shown in these figures. Furthermore, if the X table 152 is positioned in the X direction as shown in FIGS. 7B and 8B, the Y table 172 interferes with the exterior cover 120 depending on the position of the Y table 172 in the Y direction as shown in these figures. On the other hand, if the X table 152 is positioned in the X direction as shown in FIGS. 4 and 8C, regardless of the position of the Y table 172 in the Y direction, the Y table 172 does not interfere with the exterior cover 120 or the spindle 140.

Therefore, on the X direction rail 151 of the machine tool 100, as shown in FIGS. 8A to 8C, There is an area (non-interference area NIA) of the X table 152 with respect to the X direction rail 151, in which the Y table 172 does not interfere with the spindle 140 or the exterior cover 120 even when the Y table 172 as shown in FIGS. 4 and 8C is slid on the Y direction rail, and an area (interference area IA) of the X table 152 with respect to the X direction rail 151, in which the Y table 172 may interfere with the spindle 140 or the exterior cover 120 when the Y table 172 as shown in FIGS. 7A and 8A and 7B and 8B is slid on the Y direction rail 171. That is to say, the interference area IA is composed of a spindle interference area IAs, in which the Y table 172 may interfere with the spindle 140, and a cover interference area IAc, in which the Y table 172 may interfere with the exterior cover 120, and the non-interference area NIA is formed between the spindle interference area IAs and the cover interference area IAc.

As shown in FIGS. 8A to 8C, the proximity sensors 157*a* are proximity sensors whose detection positions are boundaries between the non-interference area NIA and the interference area IA of the X direction rail 151 (that is to say, a boundary between the spindle interference area IAs and the non-interference area NIA and a boundary between the cover interference area IAc and the non-interference area NIA). That is to say, the spindle side proximity sensor 157*a*1 is provided so that the detection position thereof is the boundary between the spindle interference area IAs and the non-interference area NIA of the X direction rail 151, and the cover side proximity sensor 157a2 is provided so that the detection position thereof is the boundary between the cover interference area IAc and the non-interference area NIA of the X direction rail 151. In other words, since the proximity sensors 157a are normally open type sensors, when the X table 152 is located in the non-interference area NIA, the spindle side proximity sensor 157a1 and the cover side proximity sensor 157a2 are ON, and when the X table 152 is located in the interference area IA, one of the spindle side proximity sensor 157a1 and the cover side proximity sensor 157a2 is ON, and the other is OFF.

3. Origin Return Operation

Figure 9:
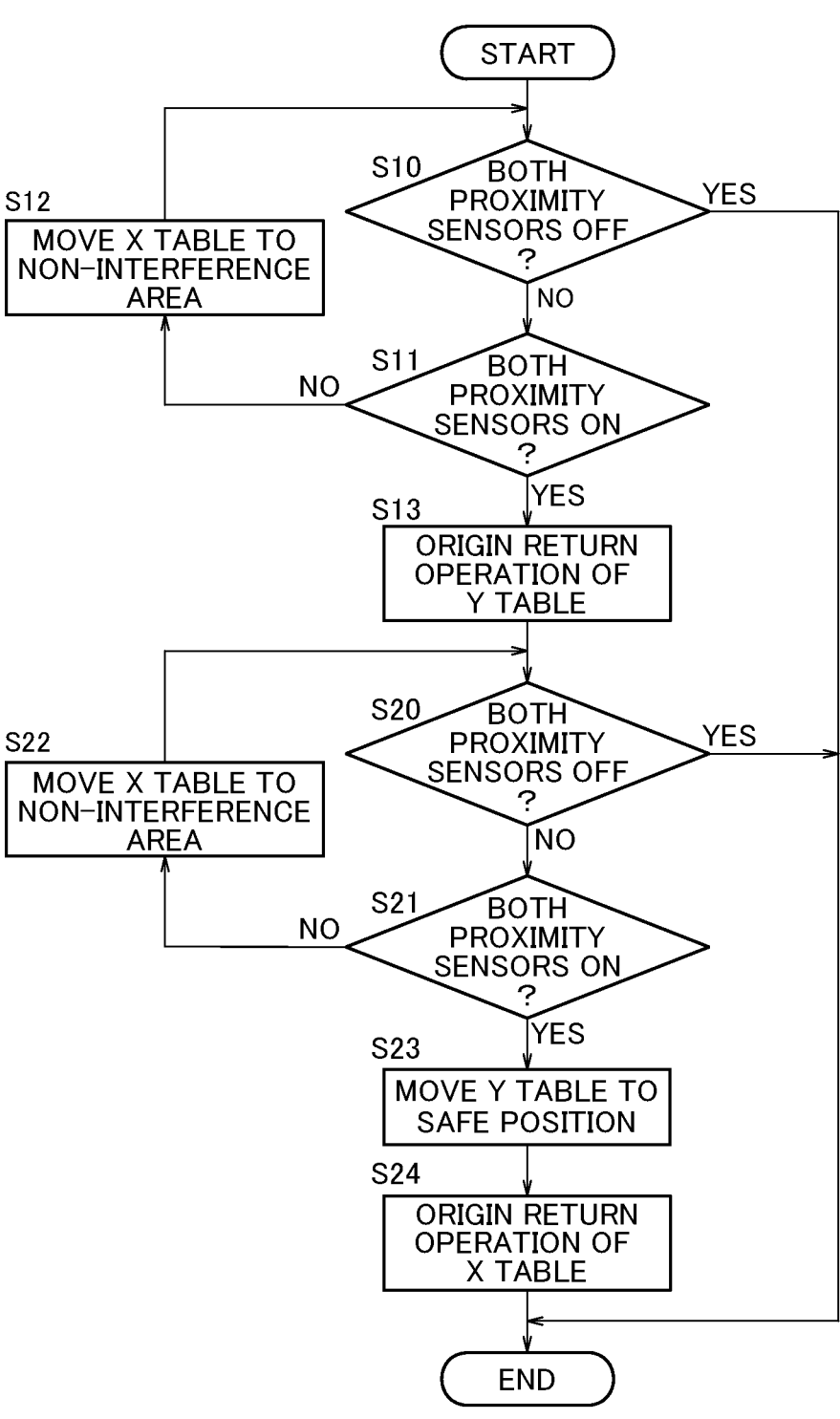
FIG. 9 is a flowchart showing the flow of an origin return operation in the machine tool shown in FIG. 1.

Next, based on FIG. 9 that is a flowchart showing the flow of an origin return operation in the machine tool shown in FIG. 1, an example of the origin return operation in the machine tool 100 after moving the Y table 172 in the Z direction and retracting the turret 180 in the Z direction with respect to the spindle 140 will be described.

3.1. Y Table Origin Return Operation

First, the control device 190 uses the X table position detection unit 157 to detect whether the X table 152 is located in either the non-interference area NIA or the interference area IA.

That is to say, the control device 190 determines whether both of the proximity sensors 157a are OFF (step S10). If both of the proximity sensors 157a are OFF, it is assumed that both of the proximity sensors 157a are out of order, and no origin return operation is performed.

Conversely, if none of the proximity sensors 157a are OFF, it is subsequently determined whether both of the proximity sensors 157a are ON (step S11). If both of the proximity sensors 157a are not ON, since the X table 152 is located in the cover interference area IAc or the spindle interference area IAs, the X table 152 is moved to the non-interference area NIA (step S12).

If both of the proximity sensors 157a are ON, since the X table 152 is located in the non-interference area NIA, the Y table positioning control section 194a of the control device 190 performs the origin return operation of the Y table 172 (step S13). Particularly, the Y table positioning control section 194a controls and drives the Y direction drive motor to move the Y table 172 until an abutment portion 172a (see FIG. 4) on the exterior cover side of the Y table 172 abuts against the cover side abutment portion 171a (see FIG. 4) provided on the Y direction rail 171. A position that is shifted by a predetermined amount from the position, at which the abutment portion 172a of the Y table 172 abuts against the cover side abutment portion 171a of the Y direction rail 171, is the origin set in the control device 190 when the Y table 172 moves in the Y direction.

3.2. X Table Origin Return Operation

After the origin return operation of the Y table 172 is completed in this way, the control device 190 detects again whether the X table 152 is located in either the non-interference area NIA or the interference area IA using the X table position detection unit 157.

That is to say, the control device 190 determines again whether both of the proximity sensors 157a are OFF (step S20). If both of the proximity sensors 157a are OFF, it is assumed that both of the proximity sensors 157a are out of order, and no origin return operation is performed.

Conversely, if none of the proximity sensors 157a are OFF, it is subsequently determined whether both of the proximity sensors 157a are ON (step S21). If both of the proximity sensors 157a are not ON, since the X table 152 is located in the cover interference area IAc or the spindle interference area IAs, the X table 152 is moved to the non-interference area NIA (step S22).

If both of the proximity sensors 157a are ON, since the X table 152 is located in the non-interference area NIA, the Y table positioning control section 194a of the control device 190 moves the Y table 172 to a predetermined Y table safe position (a position where the Y table 172 does not interfere with the exterior cover 120 and the spindle 140 regardless of the position of the X table) (step S23).

In this state, the X table positioning control section 192a of the control device 190 performs the origin return operation of the X table 152 (step S24). Particularly, the X table positioning control section 192a controls and drives the X direction drive motor 154 to move the X table 152 until an abutment portion 152b on the exterior cover side of the X table 152 abuts against the cover side stop member 156. A position that is shifted by a predetermined amount from the position, at which the abutment portion 152b of the X table 152 abuts against the cover side abutment portion 156, is the origin set in the control device 190 when the X table 152 moves in the Y direction.

In this way, the X table position detection unit 157 is also used for setting the position of the X table 152 with respect to the X direction rail 151 of the X direction slide mechanism 150.

According to one or more embodiments of the machine tool 100 described above, the Y table positioning control section 194a as the second table positioning control section sets the position of the Y table 172 as the second table with respect to the Y direction rail 171 as the second rail, in a state where the X table 152 as the first table is positioned in the non-interference area NIA. Thereby, when setting the position of the Y table 172 with respect to the Y direction rail 171, even if the Y table 172 is slid on the Y direction rail 171, the Y table 172 does not interfere with the spindle 140 or the exterior cover 120 as the cover. Thus, even when performing a positioning operation such as an origin return operation, in a state where the turret 180 as the tool post is retracted from the spindle 140 in the Z direction as the spindle direction, it may be possible to reliably prevent the Y table 172 from interfering with the spindle 140 or the exterior cover 120.

Furthermore, the X table position detection unit 157 as the first table position detection unit is also used for setting the position of the X table 152 with respect to the X direction rail 151 of the X direction slide mechanism 150 as the first slide mechanism. Thereby, when performing an origin return operation of the X table 152, it is determined whether the X table 152 is in the non-interference area NIA or in the interference area IA. Thus, even if the X table 152 is located in the interference area IA while performing the origin return operation of the X table 152, by moving the Y table 172 to a position where the Y table 172 does not interfere with the spindle 140 or the exterior cover 120 and continuing the origin return operation of the X table 152, it may be possible to prevent the Y table 172 from interfering with the spindle 140 or the exterior cover 120 during the origin return operation of the X table 152.

Furthermore, the X table position detection unit 157 includes the proximity sensors 157a that detect the X table 152 in detection positions that are boundaries between the non-interference area NIA and the interference area IA on the X direction rail 151. Thereby, the proximity sensors 157*a* detect the X table 152, and the position of the X table 152 with respect to the X direction rail 151 is detected. Thus, the machine tool 100 can grasp with a simple structure whether the X table 152 is located in the non-interference area NIA or the interference area IA.

Furthermore, the proximity sensors 157*a* of the X table position detection unit 157 are normally open type proximity sensors. Thereby, when the X table 152 is located in the spindle interference area IAs or the cover interference area IAc, or when the proximity sensors 157*a* are out of order, a signal is not output from at least one of the proximity sensors 157*a*, and when one of the proximity sensors 157*a* is out of order, the machine tool 100 determines that the X table 152 is located in the interference area IA. Thus, it may be possible to prevent performing the positioning operation by prohibiting the movement of the X table 152 when the proximity sensors 157*a* are out of order.

Modified Example

Although a machine tool according to one or more embodiments has been described above, the machine tool is not limited thereto.

For example, in one or more of the above-described embodiments, the proximity sensors are normally open type sensors from the viewpoint of failure detection, but the proximity sensors may be normally closed type sensors in which the signal is OFF while detecting an object.

REFERENCE SIGNS LIST

100 machine tool
110 bed
111 inclined base surface
120 exterior cover (cover)
121 slide door
122 operation panel accommodating recess
122*a* operation panel mounting surface
130 operation panel
140 spindle
141 spindle headstock
142 spindle main body
150 X direction slide mechanism (first slide mechanism)
151 X direction rail (first rail)
152 X table (first table)
152*a* X table base surface
152*a*1 concave area
152*b* abutment portion
153 X table drive shaft
154 X direction drive motor
155 spindle side stop member
156 cover side stop member
157 X table position detection unit (first table position detection unit)
157*a* proximity sensor
157*a*1 spindle side proximity sensor
157*a*2 cover side proximity sensor
157*b* bracket
160 Z direction slide mechanism
161 Z table
162 Z table drive shaft
170 Y direction slide mechanism (second slide mechanism)
171 Y direction rail (second rail)
171*a* cover side abutment portion

172 Y table (second table)
172*a* abutment portion
173 Y table drive shaft
180 turret (tool post)
190 control device
191 spindle control unit
192 X direction slide mechanism control unit
192*a* X table positioning control section (first table positioning control section)
193 Z direction slide mechanism control unit
194 Y direction slide mechanism control unit
194*a* Y table positioning control section (second table positioning control section)
F floor surface
PR processing room
IA interference area
IAs spindle interference area
IAc cover interference area
NIA non-interference area

The invention claimed is:

1. A machine tool comprising:
a spindle that is placed on a bed and grips a workpiece;
a first slide mechanism including a first rail that is fixed to the bed and extends in a first direction intersecting a spindle direction in which the spindle extends and a first table that is slidable along the first rail;
a second slide mechanism including a second rail that is provided on the first table of the first slide mechanism and extends in a second direction intersecting the spindle direction and the first direction and a second table that is slidable along the second rail;
a tool post that is placed on the second table of the second slide mechanism and holds a tool for machining the workpiece;
a cover that covers the spindle, the first slide mechanism, the second slide mechanism and the tool post; and
a controller that controls and drives the first slide mechanism and the second slide mechanism,
wherein the tool post is configured to approach to the spindle and the cover,
wherein the first slide mechanism includes a first table position detector that detects a position of the first table with respect to the first rail,
wherein the controller sets a position of the second table at a predetermined position with respect to the second rail,
wherein the first table position detector detects whether the first table is located in a non-interference area, in which the second table does not interfere with the spindle or the cover even when the second table is slid on the second rail, or an interference area, in which the second table may interfere with the spindle or the cover when the second table is slid on the second rail, and
wherein the controller sets a position of the second table with respect to the second rail in a state where the first table is located in the non-interference area.

2. The machine tool according to claim 1,
wherein the controller sets a position of the first table at a predetermined position with respect to the first rail, and
wherein the first table position detector is also used for setting a position of the first table with respect to the first rail of the first slide mechanism.

3. The machine tool according to claim 1, wherein the first table position detector includes at least one proximity sensor that detects the first table in at least one detection position that is at least one boundary between the non-interference area and the interference area on the first rail.

4. The machine tool according to claim 3, wherein the interference area is composed of a spindle interference area, in which the second table may interfere with the spindle, and a cover interference area, in which the second table may interfere with the cover, wherein the non-interference area is formed between the spindle interference area and the cover interference area, wherein each of the proximity sensors is provided such that a detection position thereof is at each end of the non-interference area of the first rail, and wherein the proximity sensors of the first table position detector are normally open type proximity sensors.

5. The machine tool according to claim 1, wherein the first rail is inclined with respect to a horizontal plane.

6. The machine tool according to claim 2, wherein the first table position detector includes at least one proximity sensor that detects the first table in at least one detection position that is at least one boundary between the non-interference area and the interference area on the first rail.

7. The machine tool according to claim 6, wherein the interference area is composed of a spindle interference area, in which the second table may interfere with the spindle, and a cover interference area, in which the second table may interfere with the cover, wherein the non-interference area is formed between the spindle interference area and the cover interference area, wherein each of the proximity sensors is provided such that a detection position thereof is at each end of the non-interference area of the first rail, and wherein the proximity sensors of the first table position detector are normally open type proximity sensors.

8. The machine tool according to claim 2, wherein the first rail is inclined with respect to a horizontal plane.

9. The machine tool according to claim 3, wherein the first rail is inclined with respect to a horizontal plane.

10. The machine tool according to claim 4, wherein the first rail is inclined with respect to a horizontal plane.

11. The machine tool according to claim 5, wherein the first rail is inclined with respect to a horizontal plane.

12. The machine tool according to claim 6, wherein the first rail is inclined with respect to a horizontal plane.

13. The machine tool according to claim 7, wherein the first rail is inclined with respect to a horizontal plane.

* * * * *